United States Patent [19]

Rosenberg et al.

[11] Patent Number: 6,014,251

[45] Date of Patent: Jan. 11, 2000

[54] OPTICAL FILTERS BASED ON UNIFORM ARRAYS OF METALLIC WAVEGUIDES

[75] Inventors: Armand Rosenberg, College Park; Ronald J. Tonuuci, Waldorf, both of Md.

[73] Assignee: The United States of America as represented by the Secretary of the Navy, Washington, D.C.

[21] Appl. No.: 08/823,950

[22] Filed: Apr. 8, 1997

[51] Int. Cl.⁷ ..................................................... G02B 5/20
[52] U.S. Cl. ......................... 359/350; 359/577; 359/885; 343/909
[58] Field of Search .................................. 359/350, 577, 359/885; 343/909; 333/202

[56] References Cited

U.S. PATENT DOCUMENTS

| | | | |
|---|---|---|---|
| 5,234,594 | 8/1993 | Tonucci et al. | 210/500.26 |
| 5,264,722 | 11/1993 | Tonucci et al. | 257/443 |
| 5,306,661 | 4/1994 | Tonucci et al. | 437/90 |
| 5,332,681 | 7/1994 | Tonucci et al. | 437/16 |
| 5,389,943 | 2/1995 | Brommer et al. | 343/909 |

OTHER PUBLICATIONS

Rosenberg et al, "High–Pass Optical Filters Based on Gold–Coated Nanochannel Glass Materials", Abstract submission to symposium Microporous and Macroporous Materials, Materials Research Society 1996 Spring Meeting, Apr. 8–12, 1996, San Francisco, CA.

Tonucci et al, "Nanochannel Array Glass" Science 258, 783 (1992).

Fritz Keilmann, "Infrared High–Pass Filter with High Contrast", Int. J. of Infrared and Millimeter Waves 2, 259 (1981).

T. Timusk and P. L. Richards, Near Millimeter Wave Bandpass Filters, Appl. Optics 20, 1355 (1981).

P. G. Huggard, M. Meyringer, A. Schilz, K. Goller, and W. Prettl, "Far–Infrared Bandpass Filters from Perforated Metal Screens" Appl. Optics 33, 39 (1994).

Rosenberg et al, "High–Pass Optical Filters Based on Gold–Coated Nanochannel Glass Materials" Mat. Res. Soc. Symp. Proc, vol. 431 (1996), pp. 367–372.

*Primary Examiner*—Cassandra Spyrou
*Assistant Examiner*—Darren E. Schuberg
*Attorney, Agent, or Firm*—Barry A. Edelberg; Ralph T. Webb

[57] ABSTRACT

A spectral filter is made in the form of a wafer of nanochannel glass having an array of substantially uniform parallel hollow channels of from about 0.1 microns to about 10 microns that are coated with a reflective material.

23 Claims, 8 Drawing Sheets

OPTICAL FILTERS BASED ON UNIFORM ARRAYS OF METALLIC WAVEGUIDES

BACKGROUND OF THE INVENTION

1. Field of the Invention

The present invention relates to spectral filters and methods of making spectral filters for filtering infrared, visible and ultraviolet radiation. More particularly, the present invention relates to high-pass, low-pass and band-pass filters constructed by coating the channels of a nanochannel glass array with a reflective material.

2. Description of the Related Art

Many techniques exist currently for filtering infrared, visible and ultraviolet radiation. Among these are: monochromators (grating or prism types), resonators (for example, Fabry-Perot type), multilayer dielectric thin films on appropriate substrates, films or bulk materials having appropriate dielectric functions, absorbing colored filters, scatter filters, at al., In practice, all of these techniques are adversely affected, to varying degrees, by environmental factors such as heat, humidity, vibrations, etc.; no rugged filtering technique, which would be relatively insensitive to changes in these environmental factors, exists at present.

At 100 $\mu$m and longer wavelengths, filters based on arrays of metallic waveguides have been fabricated. Such high-pass filters for the far-infrared spectral region are described in the following publications: Fritz Keilmann, Int. J. of Infrared and Millimeter Waves 2, 259 (1981); T. Timusk and P. L. Richards, Appl. Optics 20, 1355 (1981) and P. G. Huggard, M. Meyringer, A. Schilz, K. Goller, and W. Prettl, Appl. Optics 33, 39 (1994). These filters are very rugged, generally consisting of a single piece of perforated metal or grid; they are relatively light and compact, are not very sensitive to environmental factors such as heat, humidity, and mechanical vibrations, and are not affected by reasonable misalignments. Their spectral properties are relatively easy to control by modifying the geometrical parameters of the waveguides. Besides the ruggedness, far-infrared filters based on arrays of waveguides have several additional advantages over other types of filters. For a closely packed array of waveguides, the transmission of these filters greatly exceeds the fraction of open area (the total cross-sectional area of the waveguides divided by the total area covered by the array). Due to a resonance involving neighboring waveguides, the transmission can approach unity under favorable conditions, thus exceeding that obtained by other filtering methods. Also, unlike the cases of other filtering methods, the cutoff frequency is insensitive to the propagation direction of the incident radiation, while the transmission efficiency decreases only very gradually as the propagation direction deviates from the normal to the plane of the waveguide array.

Filters based on metallic waveguides are much easier to manufacture for longer wavelengths because the cutoff frequency is determined by the waveguide diameter. For a hollow cylindrical waveguide having circular cross-section and walls with infinite conductivity (an approximation valid for most metals in the far-infrared), the cutoff frequency is simply $v_c$ 0.586/d, where d is the diameter of the waveguide. The aspect ratio of the waveguide, t/d, where t is the length of the waveguide, determines the rolloff properties. Formed metallic grids have been used most commonly in the far-infrared, either singly or stacked; individually, such grids have an aspect ratio (t/d)<1, giving them relatively poor filtering properties. For larger aspect ratios at long enough wavelengths (longer than 300 $\mu$m), it is possible to manufacture a filter consisting of an array of waveguides with an aspect ratio greater than 1 by drilling holes in a piece of metal. However, such techniques cannot be extended into the near-infrared, visible, and ultraviolet regions because, in order to have cutoff frequencies in these spectral regions, holes with d between 10 and 0.1 $\mu$m and an aspect ratio (t/d)>1 are required. Arrays of such small holes are well beyond the reach of the manufacturing techniques used for the far-infrared filters. Since no economical alternative for manufacturing the required arrays of 10 to 0.1 $\mu$m holes existed previously, near-infrared, visible, and ultraviolet filters based on this concept could not be made until now.

SUMMARY OF THE INVENTION

Accordingly, it is an object of this invention to provide a method to fabricate spectral filters based on uniform arrays of metallic waveguides made from nanochannel glass materials.

It is a further object of this invention to provide spectral filters for filtering radiation in the near infrared through near ultraviolet spectral region.

It is a further object of this invention to provide filters that can operate as high-pass, low-pass or band-pass filters in the near infrared through near ultraviolet spectral region.

It is a further object of this invention to provide spectral filters are relatively rugged, being much less sensitive to environmental factors such as heat, humidity, and mechanical vibrations than current alternatives.

These and additional objects of the invention are accomplished by the structures and processes hereinafter described.

The present invention is a spectral filter comprising a wafer having an array of substantially uniform parallel hollow channels therethrough. The channels have a diameter of from about 0.1 $\mu$m to about 10 $\mu$m. The wafer has a first and a second surface substantially perpendicular to the axis of the channels, and the first and second surfaces and the channels are coated with a reflective material. The invention further relates to a method of making a spectral filter comprising the steps of (i) providing a wafer having substantially uniform, parallel, hollow channels therethrough, the channels having a diameter of from about 0.1 $\mu$m to about 10 $\mu$m, the wafer having a first and a second surface substantially perpendicular to the axis of the channels and (ii) coating the first and second surfaces and the channels with a reflective material.

BRIEF DESCRIPTION OF THE DRAWINGS

A more complete appreciation of the invention will be obtained by reference to the following Detailed Description of the Preferred Embodiments and the accompanying drawings in which like numerals in different figures represent the same structures or elements, wherein:

FIG. 4 (B) is a diagrammatic perspective view of a partially etched matrix filled with a reflective material.

DETAILED DESCRIPTION OF THE PREFERRED EMBODIMENTS

The present invention relies fundamentally on the optical properties of metallic waveguides, which allow radiation of certain wavelengths to propagate freely while strongly attenuating radiation of other wavelengths. The optical properties of the filters are controlled by adjusting the geometrical specifications of the waveguides, as well as the materials of which they are fabricated. These parameters determine whether the filters are high-pass, low-pass or bandpass, as well as determine the spectral region in which they will operate. As discussed above, the cutoff frequency is determined by the waveguide diameter. For a hollow cylindrical waveguide having circular cross-section and walls with infinite conductivity, the cutoff frequency is simply $v_c$ 0.586/d, where d is the diameter of the waveguide. This formula serves as a useful approximation for calculating the cutoff frequency of nonideal material. The aspect ratio of the waveguide, t/d, where t is the length of the waveguide, determines the rolloff properties. Since the geometrical factors in particular are relatively easy to control, the method of the present invention permits the fabrication of filters with any desired spectral characteristics within the entire spectral region covering infrared, visible and ultraviolet radiation.

Materials suitable for the practice of the invention are preferably nanochannel glass that has an array of substantially uniform, parallel, hollow channels wherein the channels have a diameter of from about 0.1 μm to about 10 μm. Such material may be obtained by methods described in U.S. Pat. No. 5,306,611, U.S. Pat. No. 5,264,722, U.S. Pat. No. 5,332,681 and U.S. Pat. No. 5,234,594, in Tonucci et al, "Nanochannel Array Glass" Science 258,783 (1992), and in Rosenberg et al, "High-Pass Optical Filters Based on Gold-Coated Nanochannel Glass Materials", Mat. Res. Soc.Symp. Proc Vol. 431 (1996), the entire disclosures of which are incorporated herein by reference in their entirety. Nanochannel glass may also be referred to as "NCG" material.

Nanochannel glass materials have been successfully thermally cycled from liquid helium temperatures to temperatures in excess of 600 degrees centigrade without damage. They can have an open area to total surface ratio in excess of 75%. When coated with noble metals, they can be made to resist deterioration in their physical and optical properties after treatment by water and a variety of chemicals. In addition, nanochannel glass is a rigid structure and therefore the components of the structure are not susceptible to mechanical vibrations over a large frequency range. When the channels are coated with a high reflectivity metal, they act as metallic waveguides.

Figure 1A:
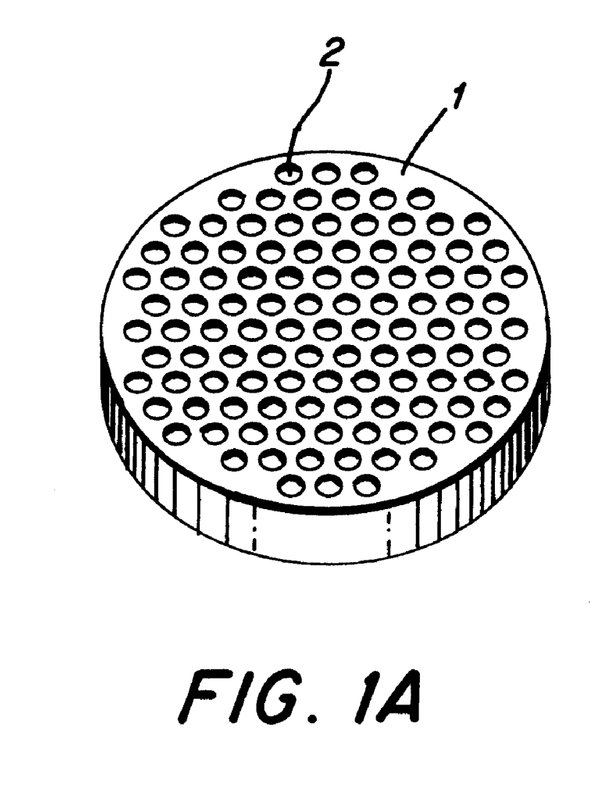
FIG. 1A is a diagrammatic perspective view of a low aspect ratio section of a uniform triangular lattice array of hollow channels contained within a nanochannel glass (NCG) structure.
Figure 1B:
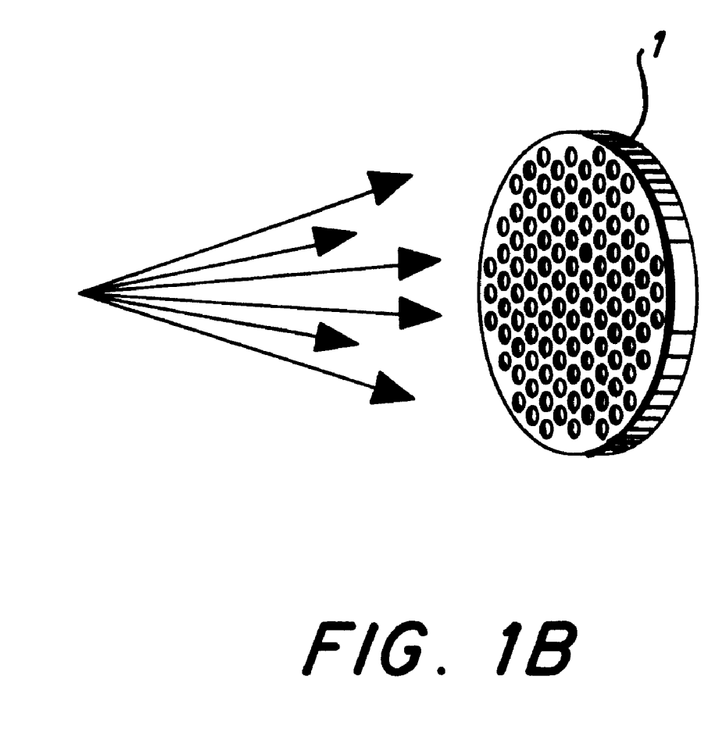
FIG. 1B is a diagrammatic depiction of the metallization process.

The invention is preferably practiced as follows. Nanochannel glass material, when it is first manufactured, generally comprises a matrix of parallel, etchable glass rods in a matrix of non-etchable glass. The nanochannel glass material is selected so that the size and spacing of the etchable glass rods corresponds approximately to the size and spacing desired for the channels. The diameter of the rods is selected according to the desired cutoff frequency for the filter. The nanochannel glass material is then shaped and polished into the form of a wafer with two flat parallel surfaces oriented perpendicularly to the axis of the etchable glass rods. The thickness of the wafer (corresponding to the length of the waveguide t, as discussed above) is chosen to be between 1 and 5000 times the diameter of the glass rods (and the diameter of the channels after etching away the glass rods). Preferably, the thickness of the wafer is between 1 and 20 times the diameter of the glass rods. The etchable glass rods are then etched to create hollow channels. FIG. 1 is a diagrammatic perspective view of a wafer 1 having hollow channels 2 etched therein. The figure is not to scale—an actual nanochannel glass wafer will have more than $10^6$ channels. A coating of high spectral reflectivity material in the spectral region of interest is deposited onto the channel walls and onto the front, side and back surfaces of the wafer by sputtering, thermal or electron beam evaporation, laser ablation, electro-deposition, chemical vapor deposition or liquid phase deposition techniques. Preferred reflective materials include Al, Ag, Au, Ni and Pt and the preferred method of depositing the material is by sputtering. FIG. 1B is a diagrammatic depiction of the wafer 1 being coated by a sputtering process. The result is the fabrication of a uniform array of identical parallel metallic coated channels or metallic waveguides which can be used as a spectral filter for the infrared, near infrared, visible, and ultraviolet spectral regions. Metal films of at least 20 nm are generally sufficient for spectral filter operation.The thickness of the coating depends on the diameter of the channels—a smaller diameter channel will have a thinner coating thereon. Preferably, the coating is between 60 nm and 1000 nm. Most preferably, the coating is a thickness equal to about 0.1 times the diameter of the channels. Before the step of coating the glass with the highly reflective material, the glass may be cleaned carefully and a layer of several nm of Ni or Cr may be deposited. These preliminary steps ensure excellent adhesion of the highly reflective material to the glass.

Figure 2:
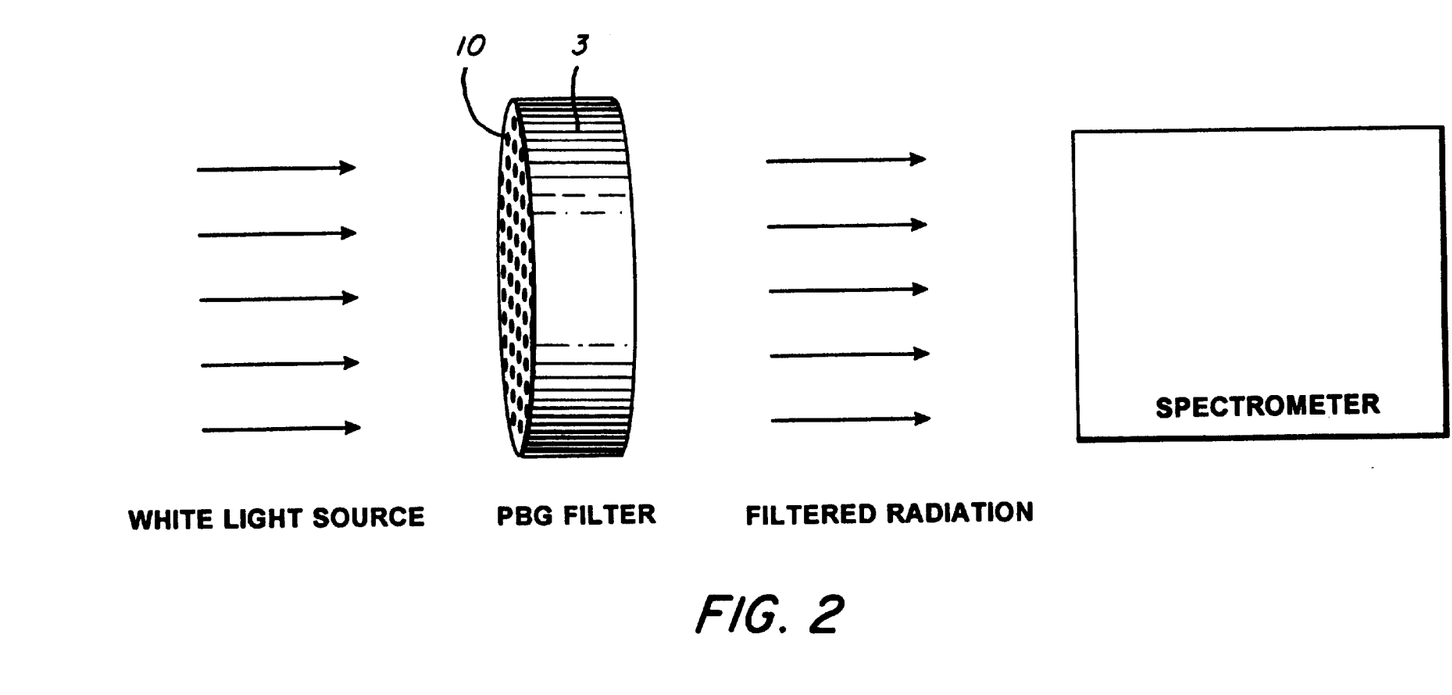
FIG. 2 is a diagrammatic depiction of the optical setup for measuring filter transmission characteristics.

As shown in FIG. 2, spectral filtering is accomplished by shining light towards the filter 3 along a direction approximately parallel to the axes of the metallized channels 10. The spectral characteristics of the filters are such that they reflect most of the radiation at wavelengths below the cutoff frequency, absorbing very little incident radiation. Thus, both high-pass (transmission) and low-pass (reflection) characteristics around a particular cutoff wavelength are possible by means of a single filter. In addition, the high spectral reflectivity of the coating materials used allows high-intensity sources of radiation, such as gas discharge lamps and high-power lasers to be spectrically filtered without damage to the filter itself.

The channel glass geometry is preferably chosen with small channel to channel separations and a high packing density. Preferably, the spacing between channels is between 0.1 and 5 μm. The small spacing between channels increases the efficiency of the device by taking advantage of resonances due to coupling between adjacent waveguides. This leads to transmission efficiencies greatly exceeding that expected on the basis of the open geometrical area of an array.

Following the manufacture of a spectral filter based on metallized NCG in accordance with the method of the present invention, the cutoff frequency of the filter can be further controlled by filling the metallized channels with a transparent dielectric material. The greater the refractive index of the dielectric material, the greater the downshift of the cutoff frequency will be.

Figure 3:
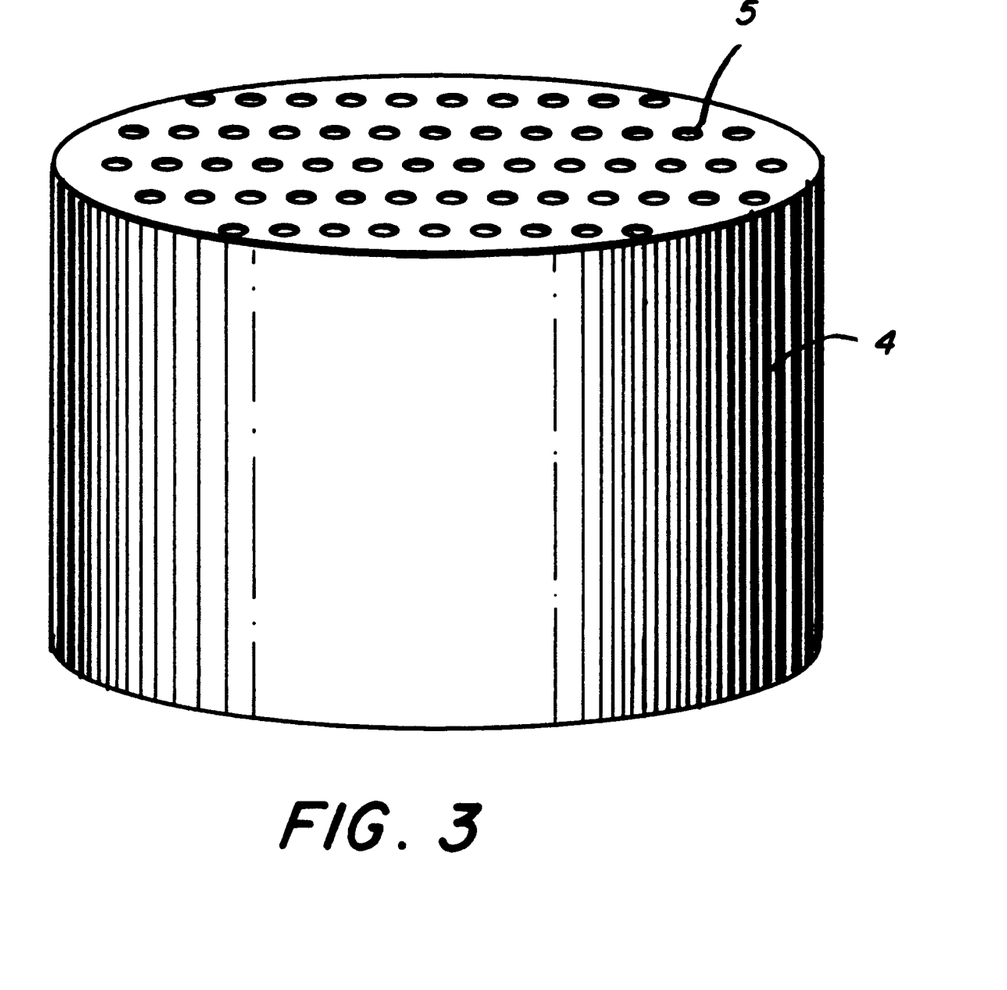
FIG. 3 is a diagrammatic perspective view of a metal filled channel spectral filter.

The NCG can also be used as a template for creating composite metal-glass structures by filling the hollow channels with metal. These inverse arrays could be used as low-pass filters, having transmission curves which are precisely the inverse of the transmission of the original NCG-based filters. The cutoff position is again determined by the geometrical factors described above. These two types of filters can then be combined to create bandpass filters with any required spectral characteristics. FIG. 3 shows a filter 4 having metal-filled channels 5.

Figure 4A:
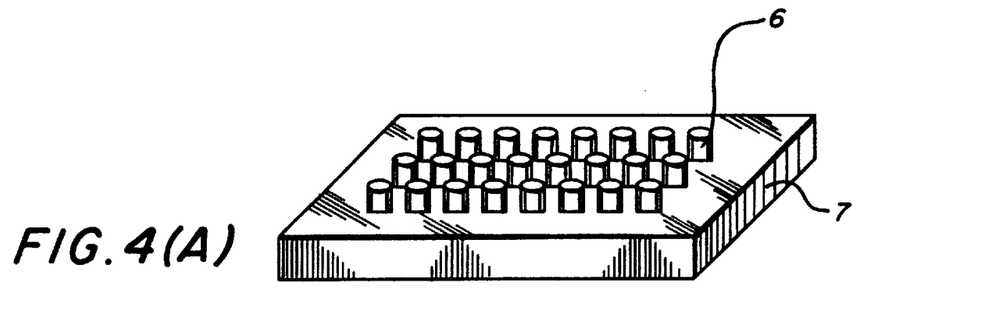
FIG. 4(A) is a diagrammatic perspective view of a partially etched matrix.
Figure 4B:
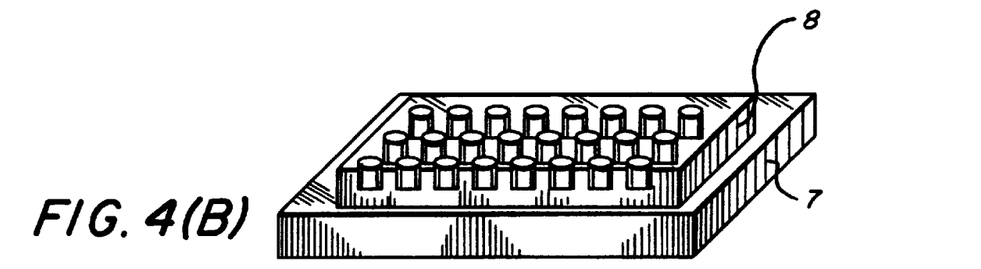
Figure 4C:
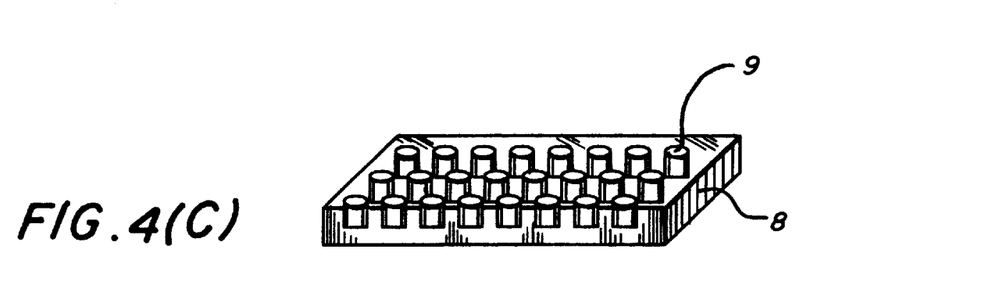
FIG. 4(C) is a diagrammatic perspective view of a filter made of reflective material.

A second method for the fabrication of spectral filters based on nanochannel glass technology involves the creation of inverse nanochannel glass structures. By this method, the etchable glass and inert glass composing a typical NCG structure are switched, that is, the starting material comprises inert glass rods in an etchable glass matrix. As shown in FIG. 4(A), the resulting structure after etching to a predetermined depth is a pattern of rods 6 extending from the unetched portion 7 of the material. As shown in FIG. 4(B), highly reflective material 8, such as one of the metals described above, can then be deposited onto the structure to surround the rods 6. After polishing the metal coated substrate to re-establish and expose the original NCG surface (the tops of the rods), reflective material 8 is removed from the structure. The highly reflective material can then serve as a filter. As shown in FIG. 4(C), the filter comprises the highly reflective material 8 having channels 9 corresponding in size and geometry to the rods 6.

The inverse NCG structure, and similar structures, can be reused if a thin sacrificial buffer layer is deposited over the pillars and pillar base prior to deposition of the high reflectivity layer. After polishing the metal coated substrate to re-establish and expose the original NCG surface (tops of the posts and buffer layer), the buffer layer can then be removed by etching, releasing the filter.

Having described the invention, the following examples are given to illustrate specific applications of the invention, including the best mode now known to perform the invention. These specfic examples are not intended to limit the scope of the invention described in this application.

EXAMPLE 1

Figure 5:
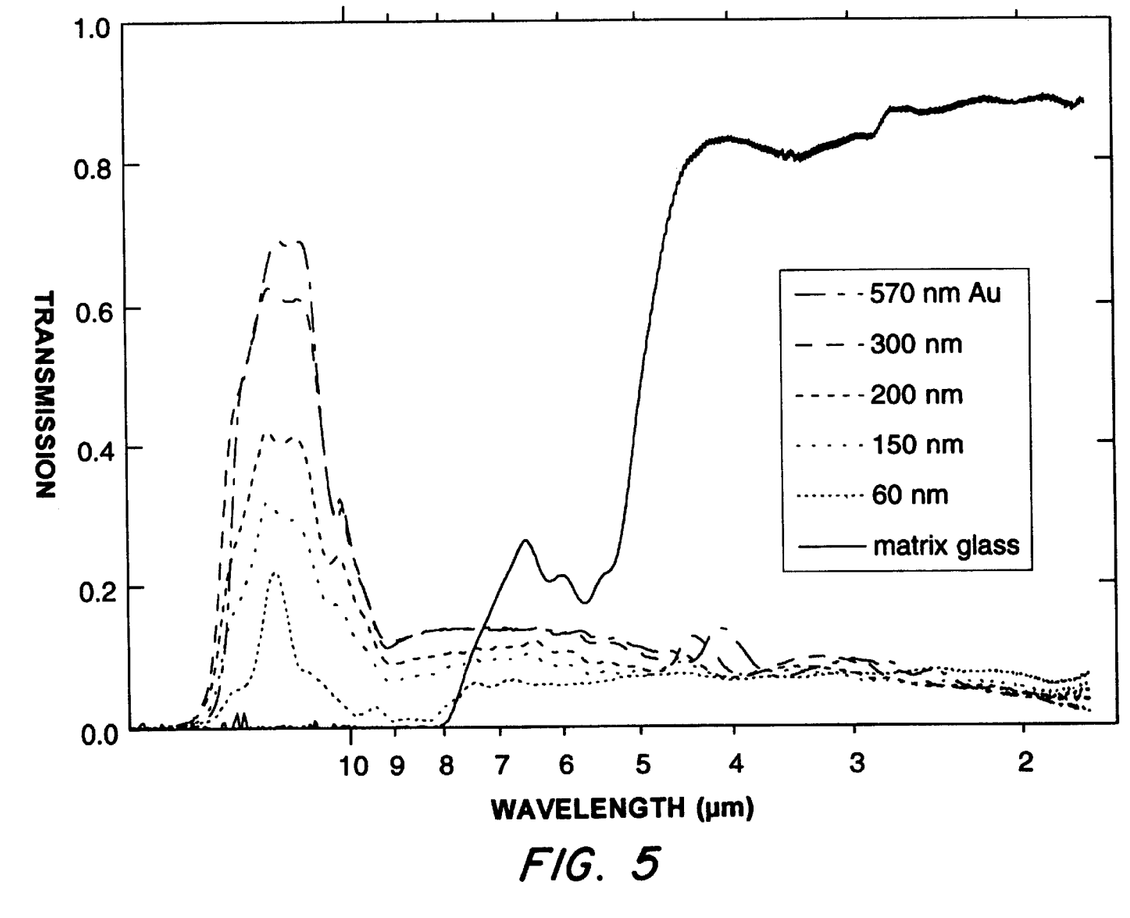
FIG. 5 is the superimposed transmission spectra for a NCG based waveguide as a function of wavelength and film thickness.
Figure 6:
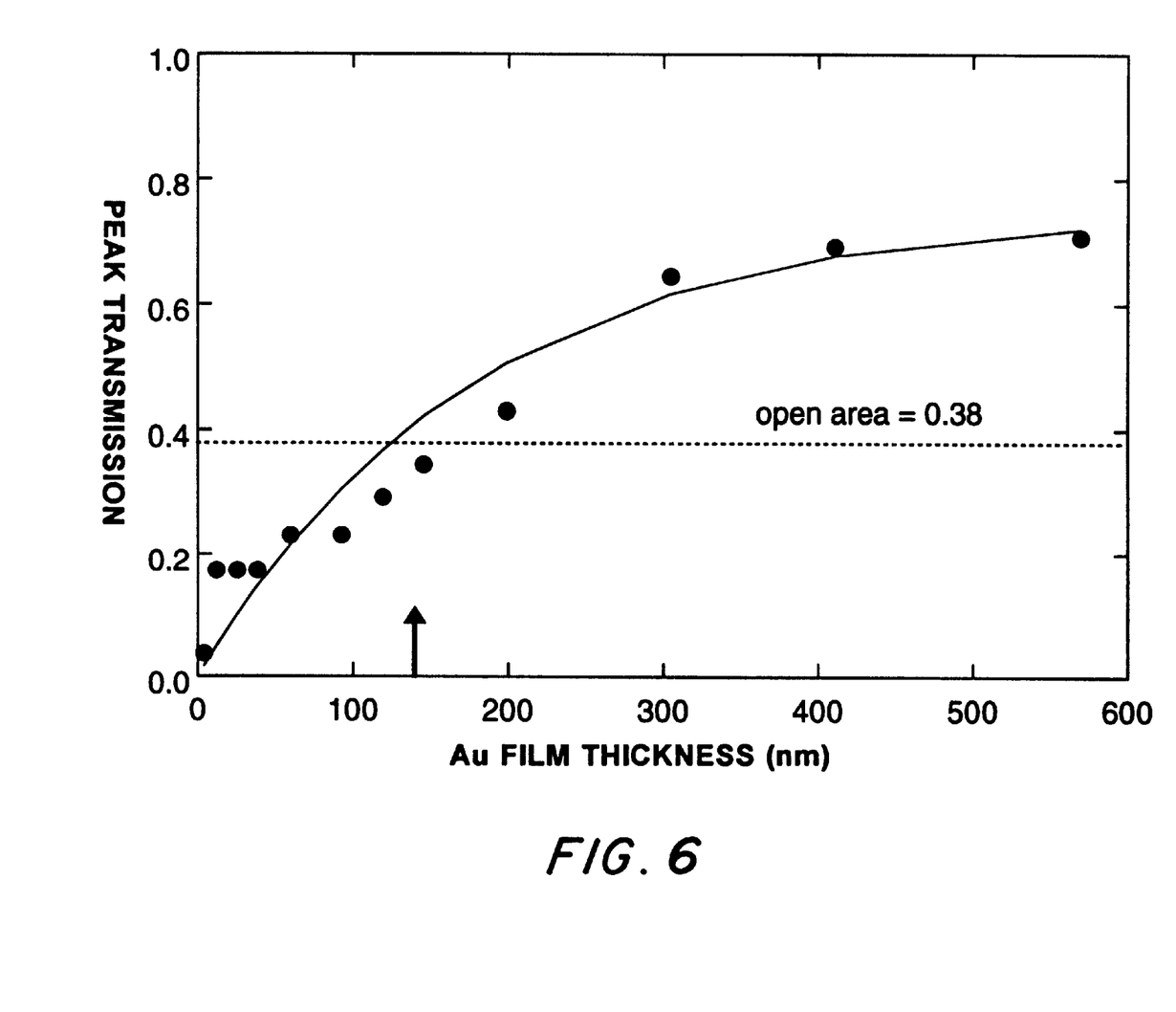
FIG. 6 is a graph showing the increase in filter transmission (efficiency) as a function of metal thickness.

A nanochannel glass wafer was formed having a high packing density triangle lattice of circular holes or channels with channel diameters equal to 8 microns, the channels being spaced 12 microns apart on centers. The channel diameters of the nanochannel glass array were chosen such that the position of the transmission edge would occur in a portion of the spectrum where the glass was highly absorbing. Therefore, any transmission through the filter would be due to the waveguide effect. For this example the ratio of total channel open area to total filter area was chosen to be 38% with an aspect ratio (t/d) of 3. The nanochannel glass arrays were metallized by sputtering gold on the top and bottom surfaces and on the inside surface of the channels to thicknesses of 60 nm, 150 nm, 200 nm, 300 nm and 570 mn. The characteristic transmission spectra for each thickness was recorded, as well and the transmission spectra for a piece of matrix glass. The superimposed spectra are shown in FIG. 5. FIG. 6 is a plot based on these data showing the increase in filter transmission (efficiency) as a function of metal thickness. As shown, a peak transmission of over 70% was achieved, considerably greater than the 38% open area of the filter itself, for coating thicknesses over 400 nm, demonstrating the resonance phenonema for close channel packing of the waveguides. This effect has only previously been reported in the microwave region.

EXAMPLE 2

Figure 7:
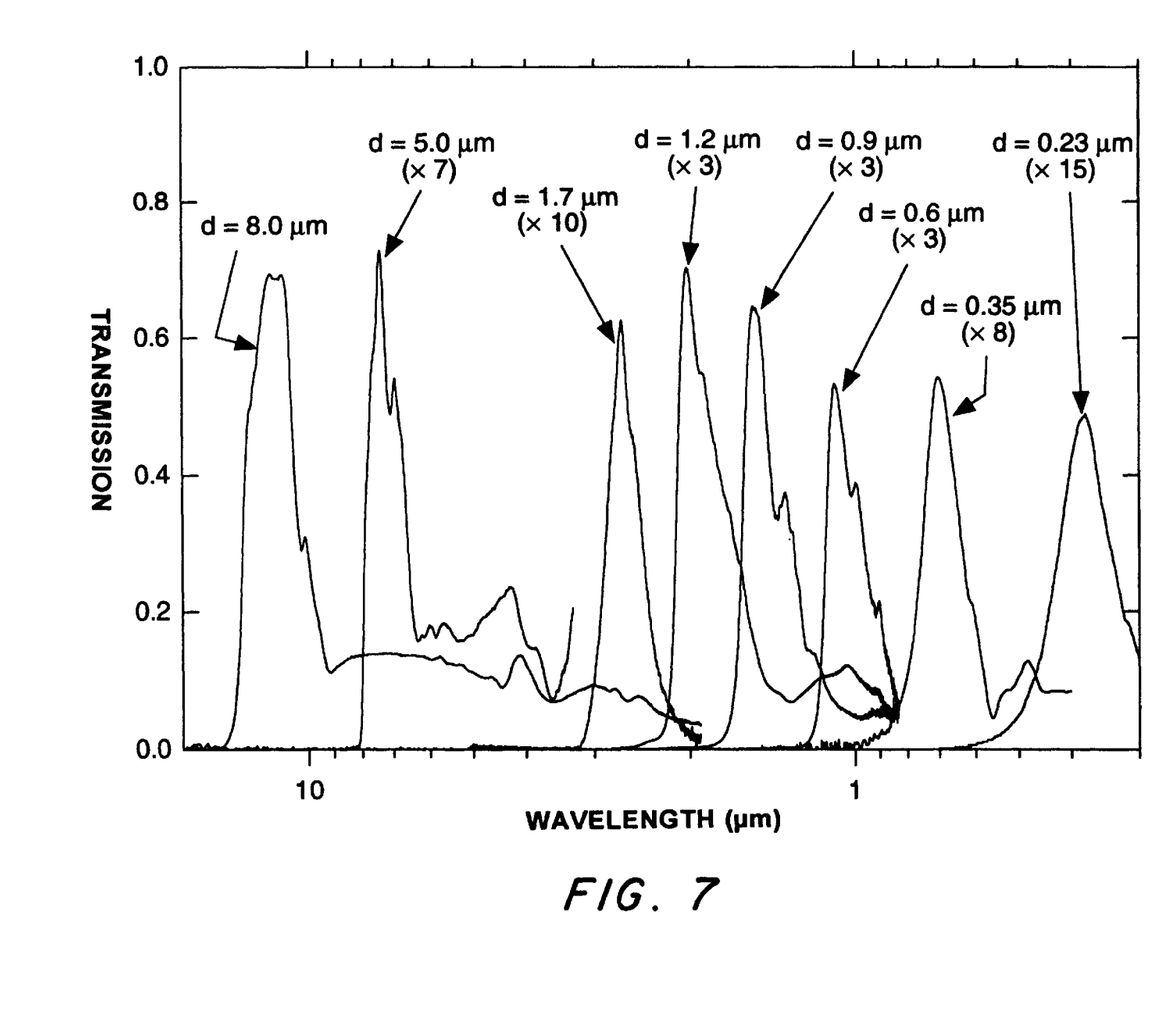
FIG. 7 is the superimposed characteristic transmission spectra of several different NCG based spectral notch filters.

Several NCG based spectral notch filters were created having the same geometric placement and channel shape of the channels in the arrays and wherein the ratio of total channel open area to total filter area was 38%. The only property that was changed for each of the filters characterized was the actual channel diameter contained within a given filter array. The filters had channel diameters of 8.0 $\mu$m, 5.0 $\mu$m, 1.7 $\mu$m, 1.2 $\mu$m, 0.9 $\mu$m, 0.6 $\mu$m, and 0.35 $\mu$m. The filters were metallized by sputtering less than 50 nm of Au on the inside surfaces of the holes. FIG. 7 shows the superimposed transmission spectra for each of the filters. The figure shows a remarkable likeness in the transmission characteristics of all of the filters measured, with cutoff wavelengths as short as 400 nm and filter transmission as short as 300 nm.

Figure 8:
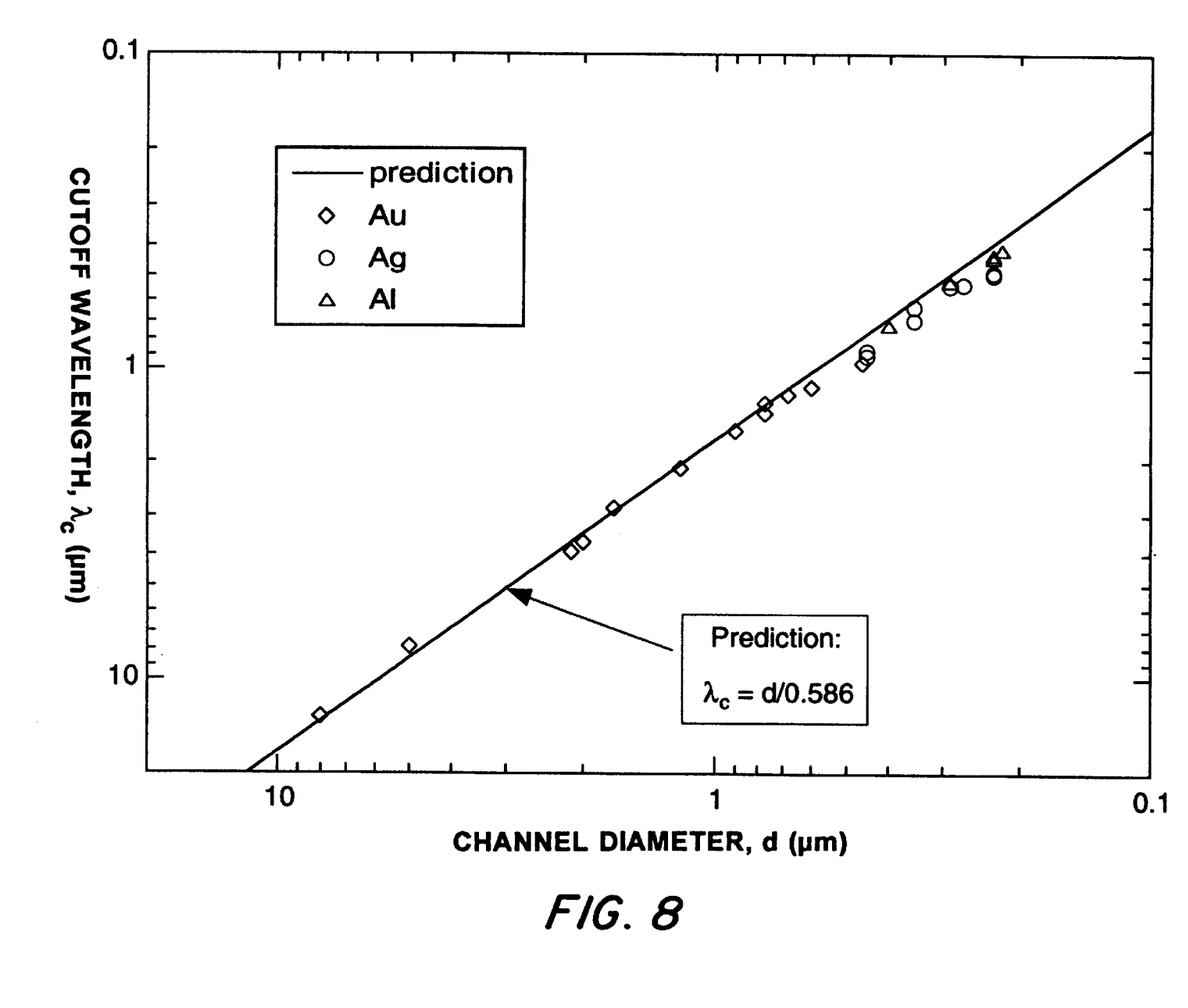
FIG. 8 is a graph showing the position of the midpoint spectral cutoff on the long wavelength side of the transmission spectra from FIG. 7 plotted as a function of channel diameter along with predicted results for perfect metals shown by the solid line.

FIG. 8 shows the position of the filter spectral cutoff on the long wavelength side of the transmission spectra from FIG. 7 plotted as a function of channel diameter along with predicted results for perfectly conductive metal coatings shown by the solid line. The figure shows there is a linear relationship between the channel diameter and cutoff wavelength of the filters for this packing geometry and channel density. Given the geometry, center-to-center distance and diameter of the channels within a particular metallized NCG array, the position and general shape of the spectral features of the filter are highly predictable.

Obviously, many modifications and variations of the present invention are possible in light of the above teachings. It is therefore to be understood that, within the scope of the appended claims, the invention may be practiced otherwise than as specifically described.

What is claimed is:

1. A spectral filter comprising
a wafer having an array of substantially uniform parallel hollow channels therethrough, the channels having a diameter of from about 0.1 $\mu$m to about 10 $\mu$m, the wafer having a first and a second surface substantially perpendicular to the axis of the channels, and wherein the first and second surfaces and the channels are coated with a reflective material and wherein the reflective material has a thickness of at least 20 nm.

2. The spectral filter of claim 1 wherein the wafer is nanochannel glass.

3. The spectral filter of claim 1, wherein the wafer has a thickness of from about 1 to about 5000 times the diameter of the channels.

4. The spectral filter of claim 1, wherein the wafer has a thickness of from about 1 to about 20 times the diameter of the channels.

5. The spectral filter of claim 1, wherein the reflective material is selected from the group consisting of Al, Ag, Au, Ni and Pt.

6. The spectral filter of claim 1, wherein the reflective material has a thickness of about 60 nm to about 1000 nm.

7. The spectral filter of claim 1, wherein the reflective material has a thickness of about 0.1 times the diameter of the channels.

8. The spectral filter of claim 1, wherein the filter is a high-pass filter.

9. The spectral filter of claim 1, wherein the filter is a low-pass filter.

10. The spectral filter of claim 1, wherein the spacing between adjacent channels is between 0.1 microns and 5 micron.

11. The spectral filter of claim 1, wherein the diameter of the channels is from about 0.6 microns to about 10 microns and wherein the filter has a cutoff position in the near infrared portion of the spectrum.

12. The spectral filter of claim 1, wherein the diameter of the channels is from about 0.25 microns to about 0.6 microns and wherein the filter has a cutoff position in the visible portion of the spectrum.

13. The spectral filter of claim 1, wherein the diameter of the channels is from about 0.1 microns to about 0.250 microns and wherein the filter has a cutoff position in the ultraviolet portion of the spectrum.

14. A method of making a spectral filter comprising the steps of
providing a wafer having substantially uniform, parallel, hollow channels therethrough, the channels having a diameter of from about 0.1 μm to about 10 μm, the wafer having a first and a second surface substantially perpendicular to the axis of the channels,
coating the first and second surfaces and the channels with a reflective material and wherein the reflective material has a thickness of at least 20 nm.

15. The method of claim 14 wherein the wafer is nanochannel glass.

16. The method of claim 14, wherein the wafer has a thickness of from about 1 to about 5000 times the diameter of the channels.

17. The method of claim 14, wherein the reflective material is selected from the group consisting of Al, Ag, Au, Ni and Pt.

18. The method of claim 14, wherein the step of coating the first and second surfaces and the channels with a reflective material is carried out by a method selected from the group consisting of sputtering, thermal beam evaporation, electron beam evaporation, laser ablation, electro-deposition, chemical vapor deposition and liquid phase deposition.

19. The method of claim 14, wherein the step of coating the first and second surfaces and the channels with a reflective material is carried out by sputtering.

20. The method of claim 14, wherein the reflective material has a thickness of from about 60 nm to about 1000 mn.

21. The method of claim 14 wherein the reflective material has a thickness of about 0.1 times the diameter of the channels.

22. The method of claim 14 wherein the transmission efficiency of the spectral filter is adjusted by selecting the thickness of the reflective material.

23. The method of claim 14, including the further step of filling the channels with a transparent dielectric material after the step of coating the first and second surfaces and the channels with a reflective material.

* * * * *